United States Patent [19]

Lindorfer et al.

[11] Patent Number: 5,000,476
[45] Date of Patent: Mar. 19, 1991

[54] ZERO BUMP STEER SUSPENSION

[75] Inventors: Michael D. Lindorfer, 1559 Portland Ave., St. Paul, Minn. 55113; Brian L. Anderson, Roseville, Minn.

[73] Assignees: Michael D. Lindorfer; Frederick C. Schilplin

[21] Appl. No.: 402,800

[22] Filed: Sep. 5, 1989

[51] Int. Cl.⁵ .............................................. B62D 17/00
[52] U.S. Cl. ..................................... 280/675; 280/673
[58] Field of Search .......................... 280/673, 675, 96; 180/793, 148

[56] References Cited

U.S. PATENT DOCUMENTS

| | | | |
|---|---|---|---|
| 3,633,933 | 1/1972 | Millard | 280/96 |
| 3,858,901 | 1/1975 | Johnson | 280/675 |
| 3,883,152 | 5/1975 | de Carbon | 280/675 |
| 4,440,419 | 4/1984 | Kosak et al. | 280/675 |
| 4,603,881 | 8/1986 | Mikina | 280/675 |

*Primary Examiner*—Kenneth R. Rice
*Attorney, Agent, or Firm*—Douglas B. Farrow

[57] ABSTRACT

A suspension system having a horizontal roll axis eliminates bump steer. The roll axis is formed by a line connecting the instant center of the axle locating links and the roll center. A pair of locating links trail rearwardly from a pivot point on the chassis to pivotal mounting point on the axle adjacent the wheels. In another embodiment, the roll center is controlled by a pair of lateral links which are mounted at their outboard ends to the axle and at their inboard ends to a pair of bellcranks pivotally mounted to the chassis, the bellcranks being linked to one another by a connecting link, gear teeth or a flexible member. The lateral links may also be mounted using compliant elastomer mounting points or by using a fore-aft pivoting A-arm mounted to the chassis. A rack and pinion steering mechanism may be mounted directly to the solid axle to enhance handling and reduce weight.

17 Claims, 11 Drawing Sheets

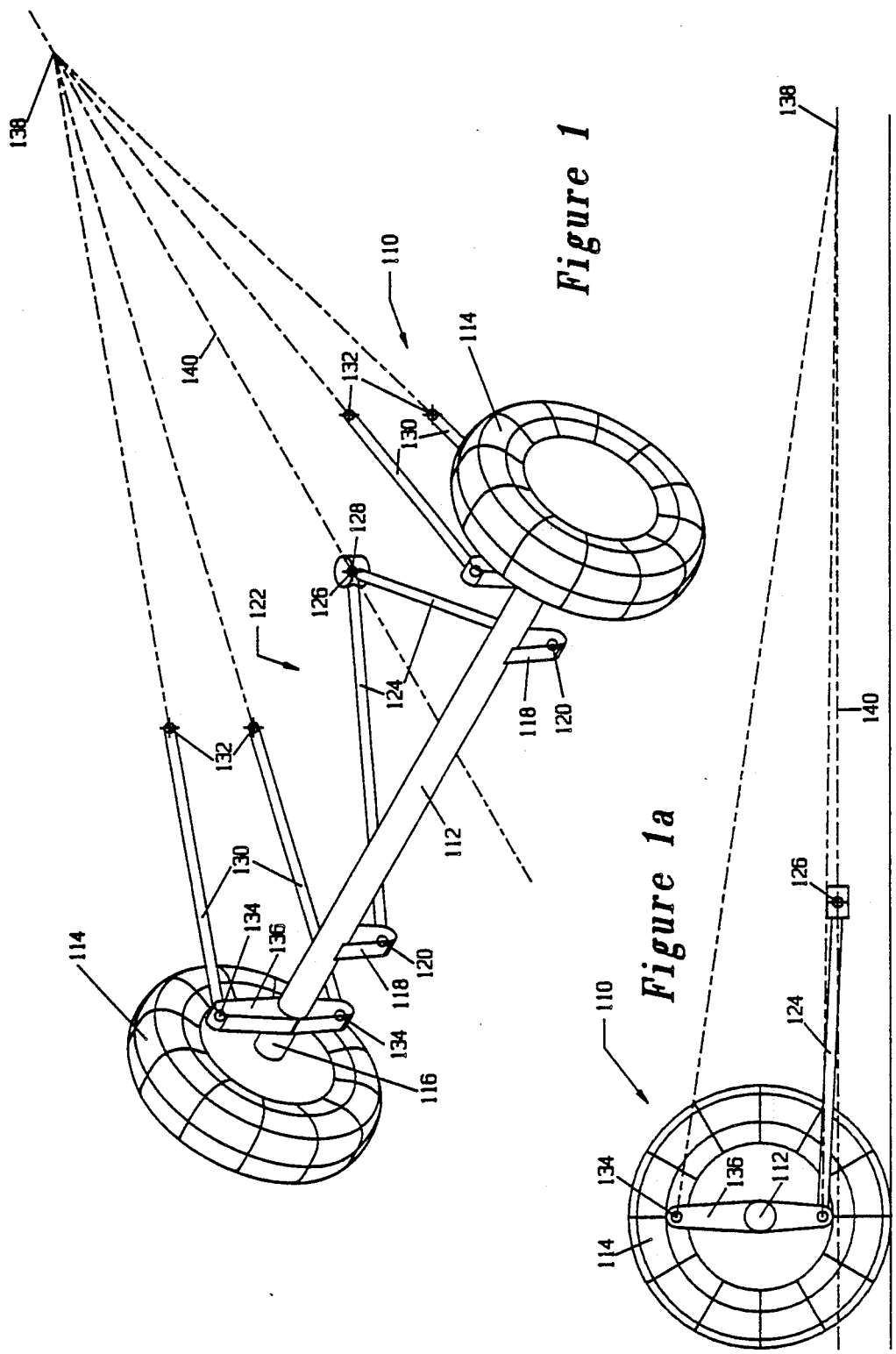

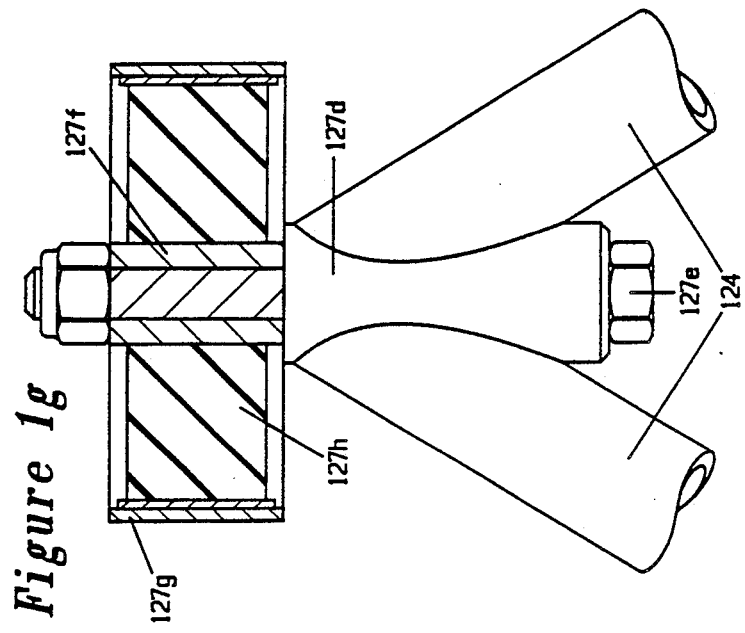
Figure 1g
Figure 1f
Figure 1e
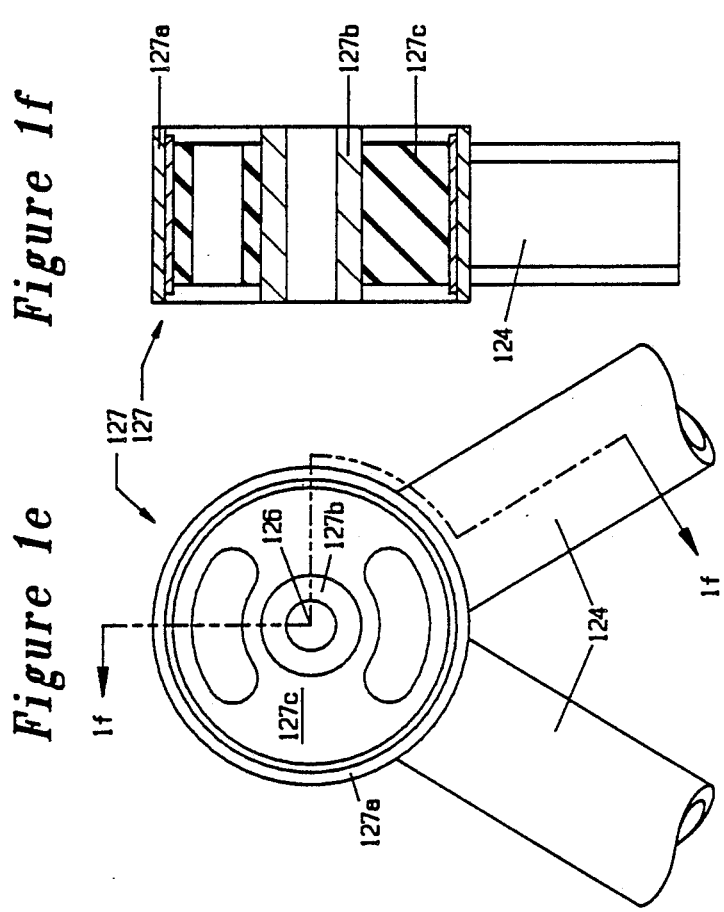
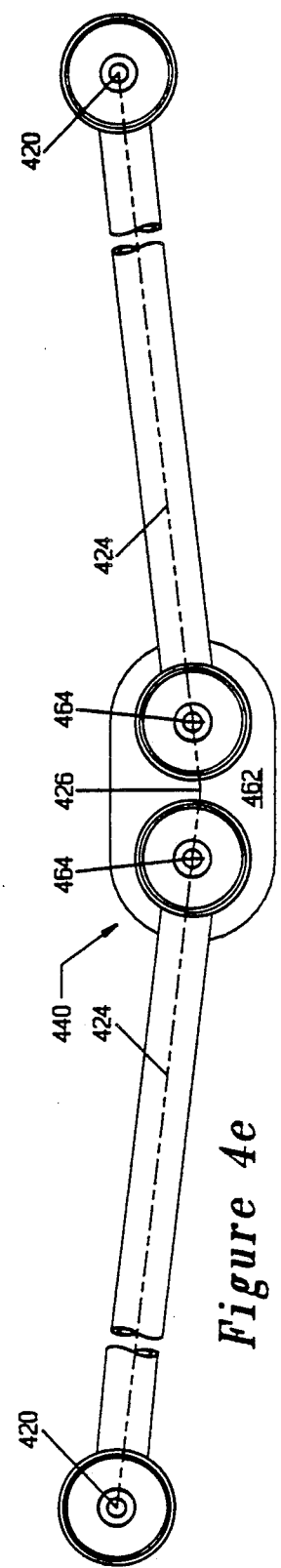
Figure 4e

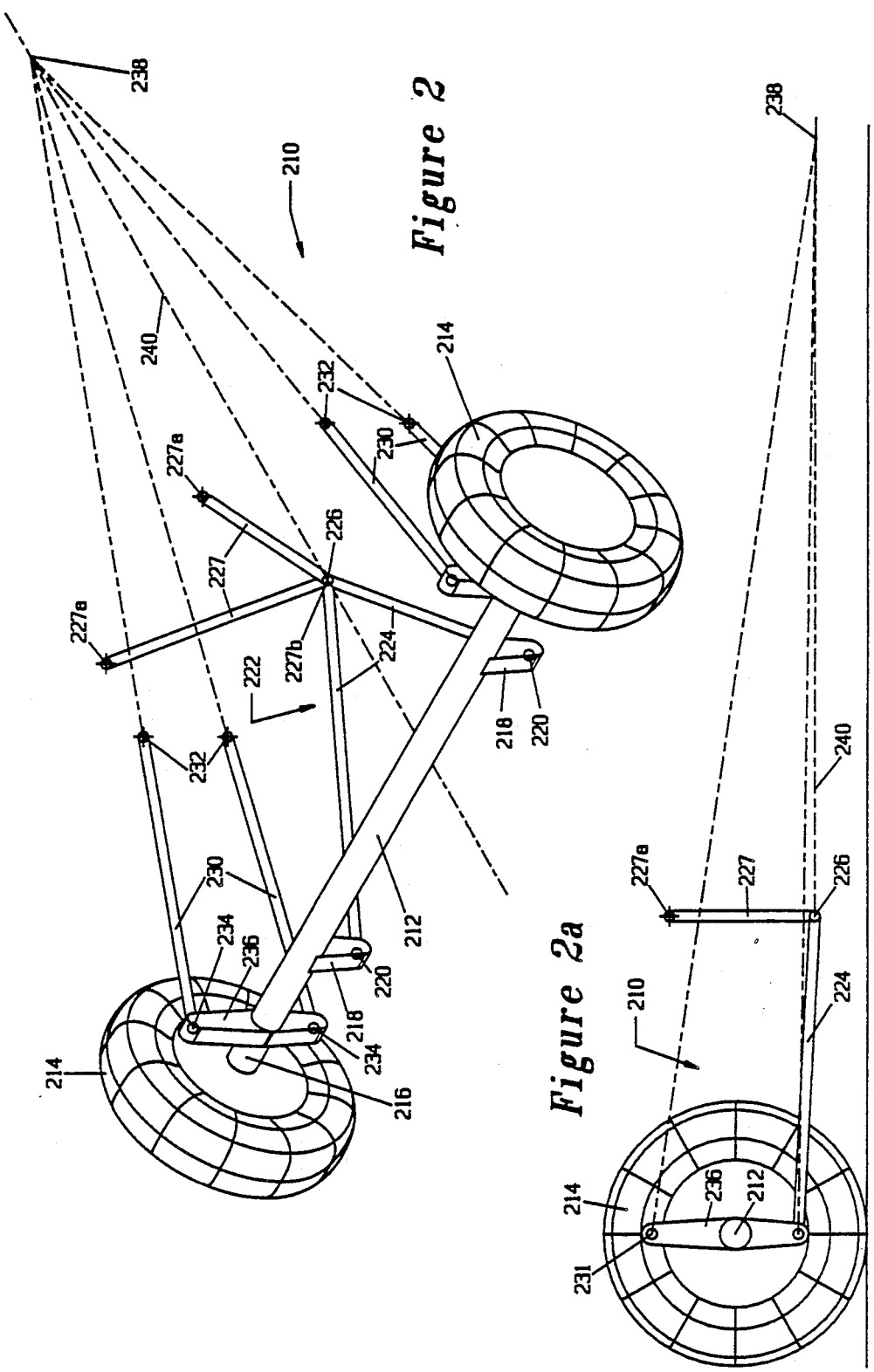

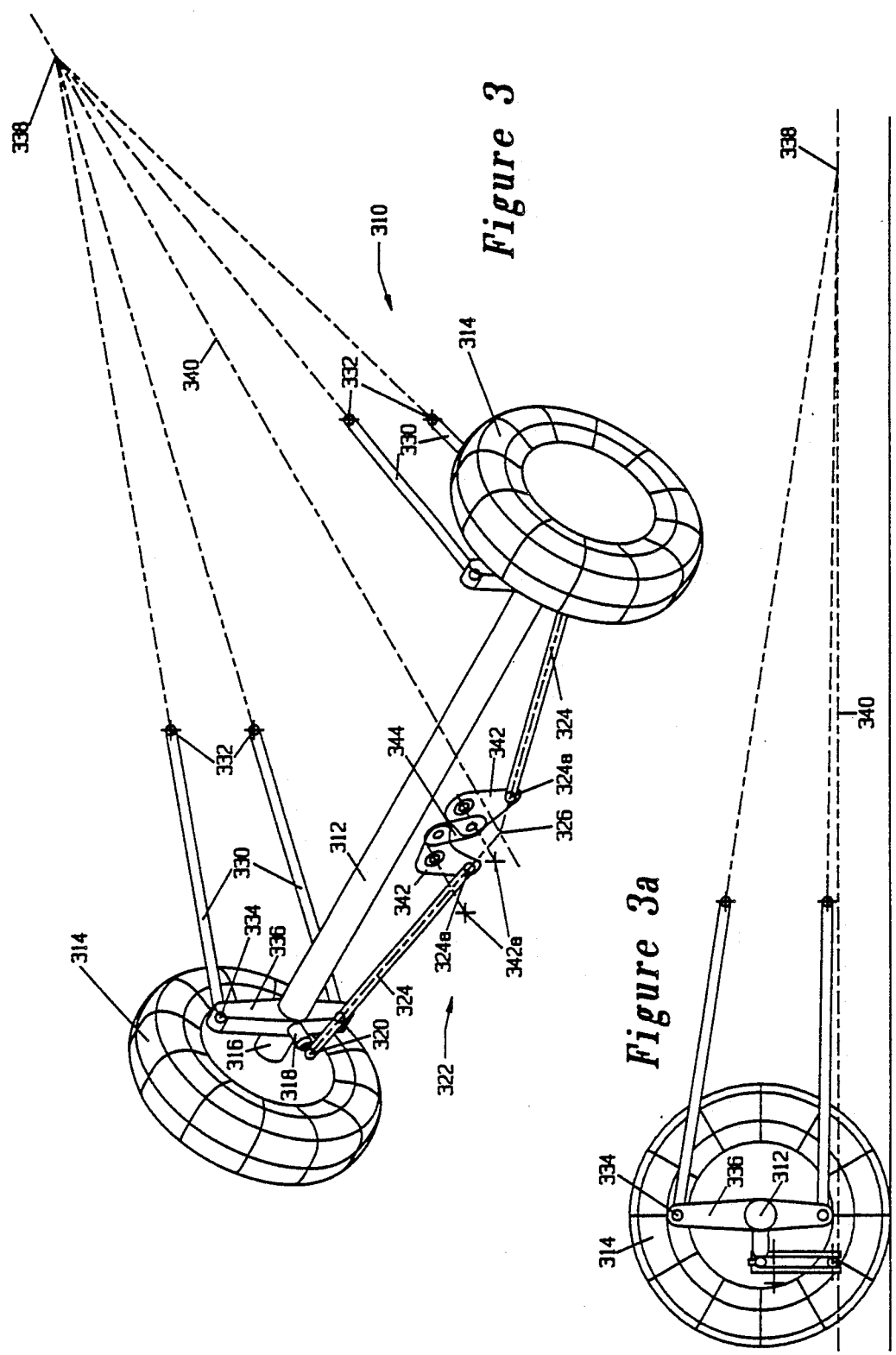

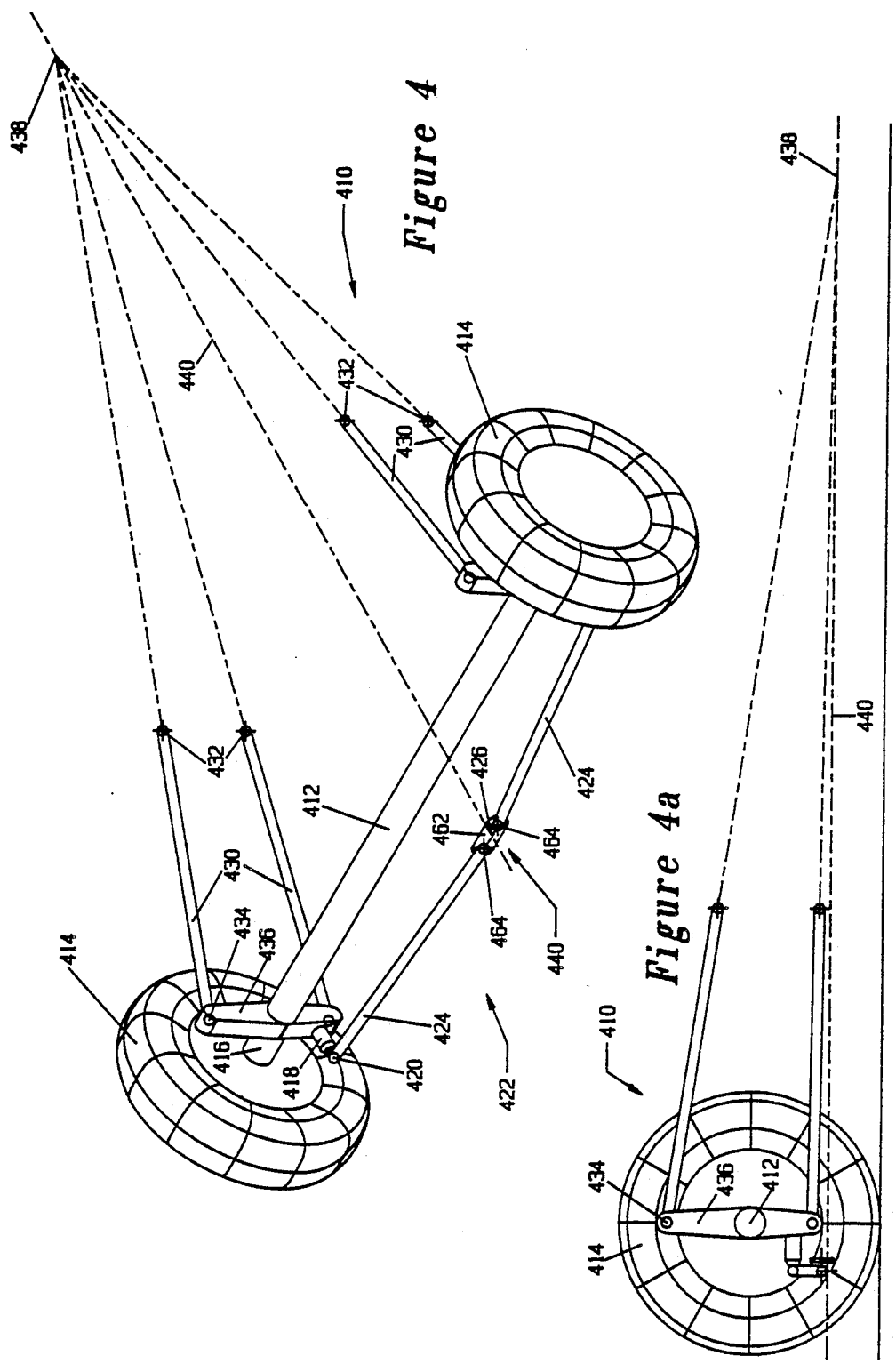

ZERO BUMP STEER SUSPENSION

BACKGROUND OF THE INVENTION

Vehicle suspensions of many types are obviously old and well known. Solid axles, also known as live or beam axles, are of course one of the oldest known suspension types. While such axles offer the benefit of simplicity, the ability to maintain the desired degree and kind of roll center position and steering accuracy has to date been less than satisfactory.

SUMMARY OF THE INVENTION

Applicant's general discovery is that maintaining a generally horizontal roll axis for an axle leads to zero bump steer. Accordingly, angling of the roll axis leads to increasing bump steer so that once recognized, the desired amount can be designed in.

While the term roll axis has sometimes been used in the literature to refer to the line connecting the front and rear axle roll centers, as used herein, the term will refer to an individual axle unless otherwise stated. The roll axis (of the axle) is formed by a line connecting the lateral locating mechanism's point of action (LLMPA) and the instant center of convergent links that provide rotational as well as longitudinal positioning at each end of the axle. These links will be referred to as trailing links or trailing linkage. The roll center is at the intersection of the roll axis and a vertical plane containing the transverse center line of said axle.

In the preferred embodiment of the invention, it is recognized that the distance of the trailing linkage instant center from the axle has a substantial control over the amount of anti-dive or anti-squat which can be attributed to that axle. The farther the instant center of the trailing linkage is located in front of the rear axle and behind the front axle, the less pronounced the anti-dive/anti-squat is and thus the designer may control the exact amount by thoughtful placement of the instant centers of the trailing linkage.

In the simplest version of the preferred embodiment, a pair of arms acting as a lateral locating mechanism trail rearwardly from a common point on the chassis and are pivotally mounted to the axle at points adjacent each wheel. By adjusting the height of this mounting point and the relative locations of the other (minimum three or more) trailing links which locate the axle, the roll axis of the axle can be designed to be horizontal and thus practically remove bump steer from the system. Conversely, slight angling of the roll axis can induce bump steer which, once recognized, can be used to correct other system errors or to improve vehicle stability.

It should be recognized that while the term "trailing links" is used herein, leading and trailing links are in most cases equally applicable and contemplated as equivalents. The term "trailing linkage" includes convergence at infinity or parallel, i.e. a suspension with no anti-dive/anti-squat, and "trailing linkage" to promote dive and squat. Also, the instant invention is generally applicable to steered and non-steered as well as both front and rear axles. It is also recognized that the trailing links can extend from the axle to the convergent point but in practice this is often restricted by space limitations and is not needed. A normal passenger car with links as short as fifteen inches can easily achieve total bump steer errors as low as ten minutes of a degree in ten inches of tire travel.

In the preferred embodiment, it is recognized that the relative heights of the front and rear roll centers affect vehicle handling dynamics and that having the roll centers move with the chassis makes the suspension system compensate for static and dynamic load changes. For example, adding fuel to the rear of a vehicle will cause oversteer. With the instant invention, the rear roll center moves downward with the chassis and the front roll center moves upward to a lesser extent thereby inducing compensating understeer and restoring stable vehicle handling. These actions are normally characteristic features of modern independent suspension, i.e. the roll center height follows the chassis height. With the invention, the roll center follows the chassis of a solid axle suspension system, the compatibility with independent suspension is enhanced.

In a second version of the preferred embodiment, the LLMPA, rather than being directly attached to the chassis, is located by two links converging at a common point of attachment to the LLMPA and are pivotally mounted to the chassis such that the LLMPA is located laterally and vertically.

Several other embodiments are provided which accomplish the same result but are useable in different situations depending on space availability and the like. In particular, in a second embodiment, lateral links from the axle lead inwardly and each is attached to a bell crank, the inner ends of each bell crank being pivotally attached together by a connecting link. The bell cranks are pivotally mounted to the chassis and allow placement of an appropriate roll center. This embodiment also provides an easily locatable and variable roll center height as well as improving ground clearance.

In yet another similar embodiment of the invention, the two bell cranks mentioned are connected to one another by gear teeth and in yet another embodiment, the bell cranks are connected by a flexible member such as a fiber or fabric reinforced rubber member or the like. In yet another embodiment, the lateral links are attached to the axle adjacent the wheels and lead inwardly to centrally located adjacent mounting points on the chassis. Elastic bushings are provided at the attachment points to provide suitable compliance to prevent suspension binding.

In conventional solid axle vehicles, the steering gearbox is mounted to the chassis and connected to the wheels by links which move substantially as the suspension moves through its travel. The conventional system involves the chassis and frequently the springing medium as part of the load path of the steering. The invention of attaching the rack and pinion steering mechanism directly to the axle yields substantial benefits. The size and number of components involved with the steering system can be significantly reduced while improving steering precision and reliability. In fact, by attaching the rack and pinion to the axle, the size of the rack can be smaller than the rack used in double "A" arm independent suspension systems. The reason for this is that the angularity of the link connecting the spindle steering arm and rack is reduced thereby reducing the bending loads on the rack shaft and housing.

The steering column between the steering wheel and the pinion must accommodate changes in length and pinion position but these requirements are compatible with the safety requirements for crash protection. The small bump steer error introduced when the chassis (and steering wheel) roll in relation to the axle can easily be compensated for by a slight angling of the roll axis for that axle.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 shows a perspective view of the suspension of the instant invention.

FIG. 1a shows a side plan view of the instant invention.

FIG. 1e shows a detail of the lateral locating mechanism mounting point of FIG. 1.

FIG. 1f is a sectional view taken along line 1f—1f of FIG. 1e.

FIG. 1g shows a detail of an alternate embodiment of the lateral locating mechanism mounting point of FIG. 1.

FIG. 2 shows a first alternate embodiment of the instant invention in perspective.

FIG. 2a shows a side plan view of the FIG. 2 embodiment.

FIG. 3 shows a second alternate embodiment with the bell crank mechanism.

FIG. 3a shows a side plan view of the FIG. 3 embodiment.

FIG. 4 shows a third alternate embodiment of the instant invention in perspective.

FIG. 4a shows a side plan view of the FIG. 4 embodiment.

FIG. 4e shows a detail view of the roll center mechanism of the FIG. 4 embodiment.

DESCRIPTION OF THE PREFERRED EMBODIMENT

Figure 1B:
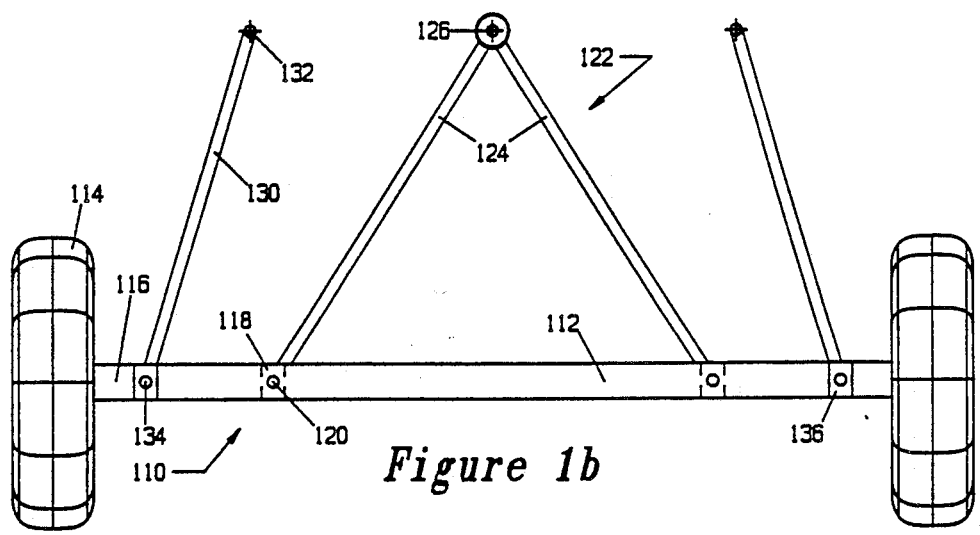
FIG. 1b shows a top plan view of the instant invention.
Figure 1C:
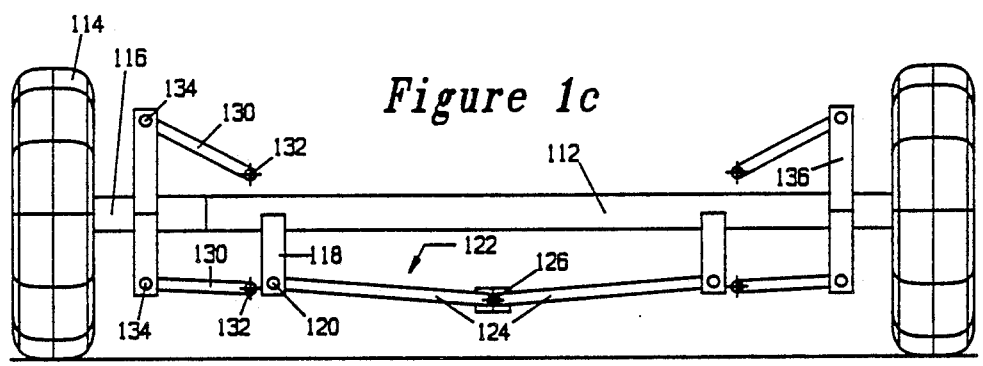
FIG. 1c shows a rear plan view of the instant invention in a normal (non-bump) condition.
Figure 1D:
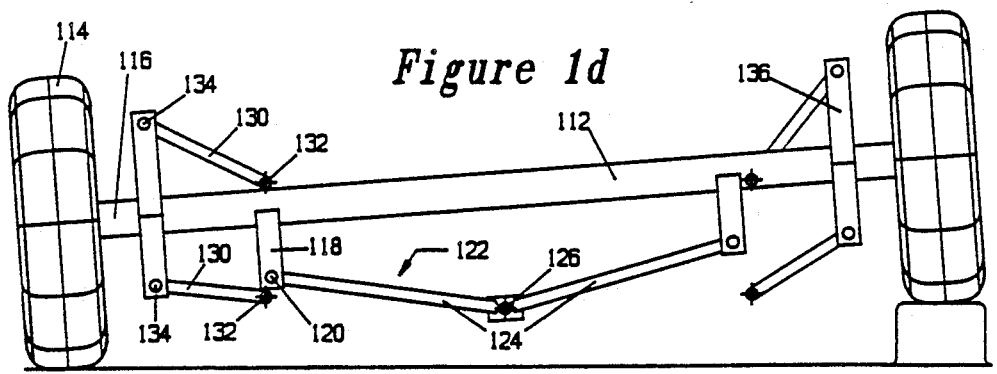
FIG. 1d shows the invention with one wheel going over a bump.

The suspension of the instant invention shown in FIGS. 1-1g, generally designated 110 is designed for use with a vehicle having an axle 112 having wheels 114 located at either end 116. Mounting brackets 118 depend downwardly from axle 112 and have mounted to pivot points 120 thereon a lateral locating mechanism 122 comprising two links 124 which converge forwardly at a pivoting mount 126 on the chassis 128. As used herein, the crosshairs (+) are used to designate a point of attachment to the chassis while a circle (o) is used to designate a pivoting connection between suspension members and/or the chassis. Similarly, trailing links 130 (pivotally mounted to chassis 128 at points 132) are attached at their rearward end pivot points 134 to brackets 136 on axle ends 116. While the preferred embodiment utilizes four trailing links 130, it can be readily recognized that a minimum of three such links is required and more can be provided as desired. The trailing links 130 can be attached to chassis 128 and axle 112 in a variety of locations with satisfactory results keeping in mind that in some cases, compliant mounting points may be required to prevent binding.

As can be seen in FIG. 1, the instant center 138 of the linkage is drawn by extending on paper the longitudinal axis of the links 130 (as shown by dotted lines in FIGS. 1 and 1a) to the point where they converge at an instant center 138. In the embodiment of FIG. 1, the roll axis 140 is formed by connecting the instant center 138 and LLMPA 126.

FIGS. 1e and 1f show in detail the pivoting mount 127 of the FIG. 1 embodiment. A cylindrical member 127a is attached by welding or the like to the ends of links 124. A bushing 127b is retained in the center of member 127a by an annular elastomeric donut 127c which serves to allow an appropriate amount of compliance so that the suspension does not bind up. A bolt or the like (not shown) is placed through bushing 127b to secure pivoting mount 127 to chassis 128.

FIG. 1g shows in detail an alternative embodiment of the pivoting mount 127 of the FIG. 1 embodiment. A member 127d is attached by welding or the like to the ends of links 124. A bushing 127f is attached to member 127d by a fastener 127e. Located in the center of cylindrical member 127g (which is attached to chassis 128) is an annular elastomeric donut 127h which serves to allow an appropriate amount of compliance so that the suspension does not bind up.

Figure 2B:
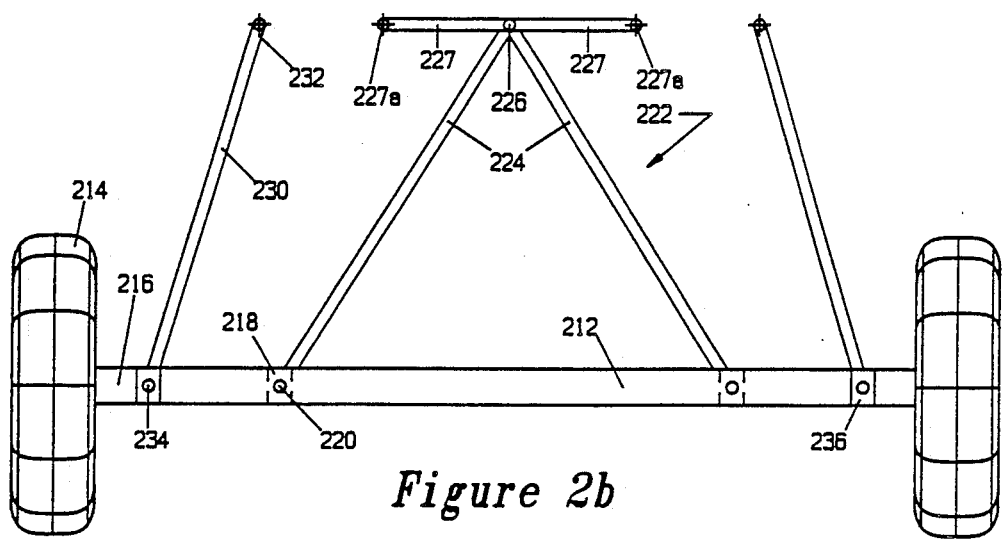
FIG. 2b shows a top plan view of the FIG. 2 embodiment.
Figure 2C:
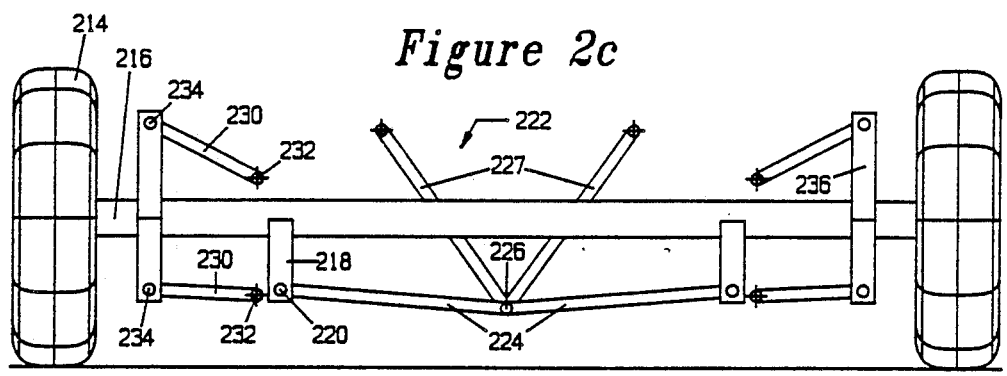
FIG. 2c shows a rear plan view of the FIG. 2 embodiment at normal ride height.
Figure 2D:
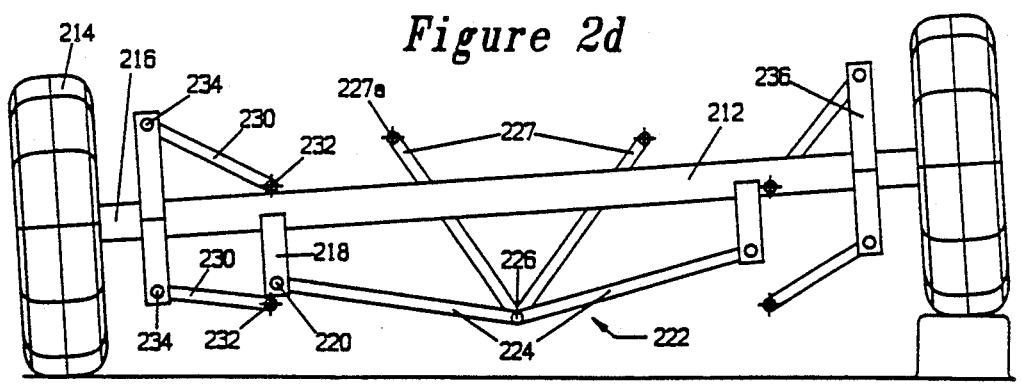
FIG. 2d shows a rear plan view of the FIG. 2 embodiment with one wheel at full bump.

The suspension of the alternate embodiment shown in FIGS. 2-2d, generally designated 210, is designed for use with a vehicle having an axle 212 having wheels 214 located at either end 216. Mounting brackets 218 depend downwardly from axle 212 and have mounted to pivot points 220 thereon a lateral locating mechanism 222 comprising two links 224 which converge forwardly to LLMPA 226 at which point they are attached by pivot 227b to locating links 227 which serve to vertically and laterally locate lateral locating mechanism 222. Links 227 pivot on the chassis 228 at points 227a. Similarly, trailing links 230 (pivotally mounted to chassis 228 at points 232) are attached at their rearward end pivot points 234 to brackets 236 on axle ends 216.

As can be seen in FIG. 2, the instant center 238 of the linkage is drawn by extending on paper the longitudinal axis of the links 230 (as shown by dotted lines in FIGS. 2 and 2a) to the point where they converge at an instant center 238. In the embodiment of FIG. 2, the roll axis 240 is formed by connecting the instant center 238 and LLMPA 226.

Figure 3B:
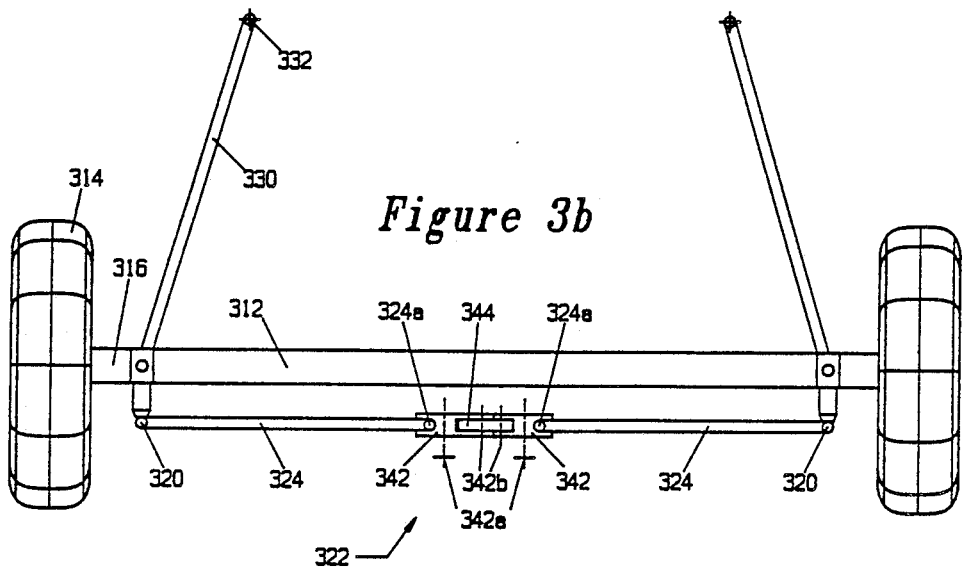
FIG. 3b shows a top plan view of the FIG. 3 embodiment.
Figure 3C:
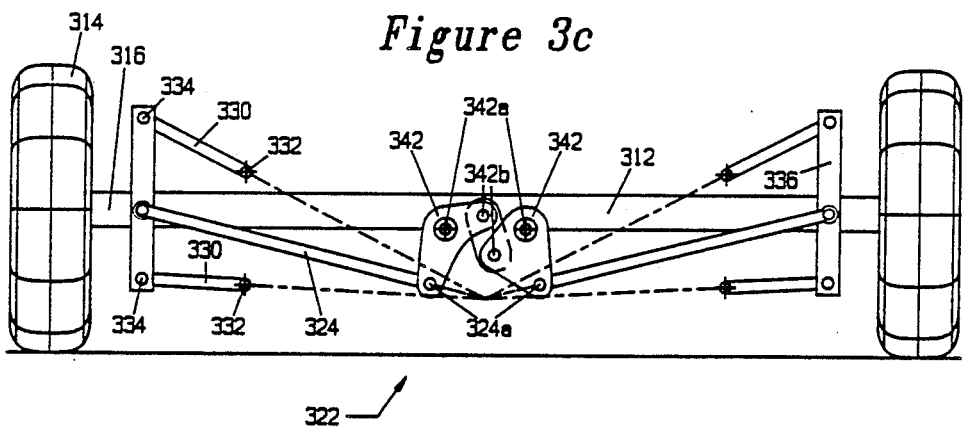
FIG. 3c shows a rear plan view of the FIG. 3 embodiment at normal ride height.
Figure 3D:
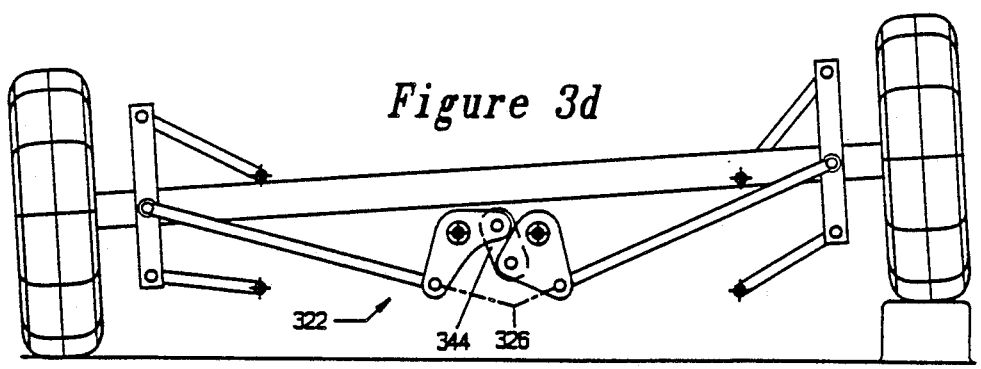
FIG. 3d shows a rear plan view of the FIG. 3 embodiment with one wheel at full bump.
Figure 3E:
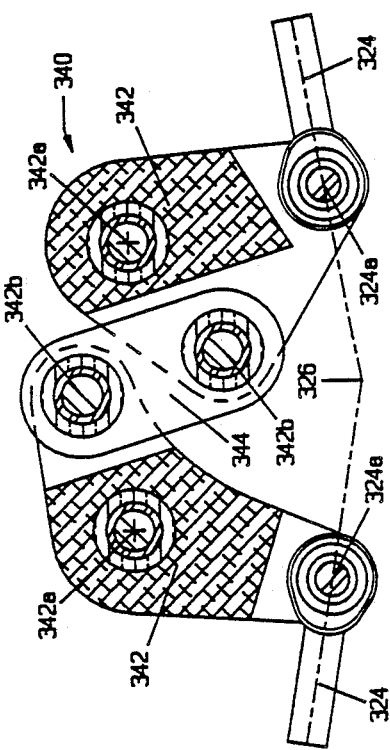
FIG. 3e shows a detail view of the bell crank of the FIG. 3 embodiment.

The suspension of the alternate embodiment shown in FIGS. 3–3e, generally designated 310, is designed for use with a vehicle having an axle 312 having wheels 314 located at either end 316. Mounting brackets 318 depend from axle 312 and have mounted to pivot points 320 thereon a roll control mechanism 322 comprising two links 324 which converge to a bell crank mechanism 340.

Bell crank mechanism 340 is comprised of two cranks 342 which pivot relative to chassis at points 342a and are attached to links 324 at pivot points 324a. The cranks 342 are connected to one another by link 344 at pivot points 342b. Similarly, trailing links 330 (pivotally mounted to chassis at points 332) are attached at their rearward end pivot points 334 to brackets 336 on axle ends 316.

As can be seen in FIG. 3, the instant center 338 of the linkage is drawn by extending on paper the longitudinal axis of the links 330 (as shown by dotted lines in FIGS. 3 and 3a) to the point where they converge at an instant center 338. The LLMPA 326 is drawn by extending on paper the longitudinal axis of the links 324 (as shown by dotted lines in FIGS. 3, 3c, 3d and 3e) to the point where they converge to form LLMPA 326. In the FIG. 3 embodiment, the roll axis 340 is formed by connecting the instant center 338 and LLMPA 326.

Figure 3G:
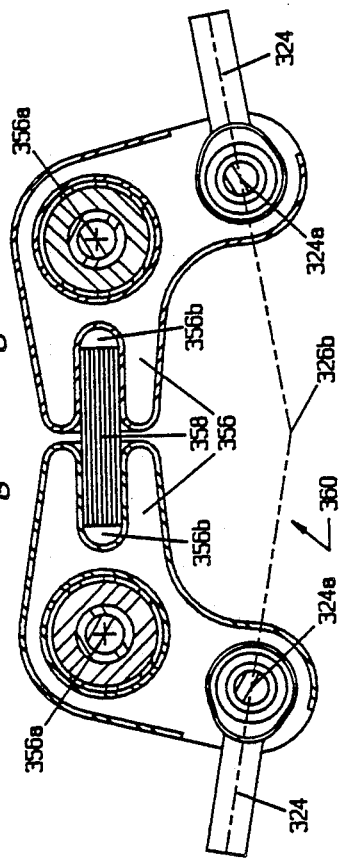
FIG. 3g shows another alternate embodiment of the bell crank mechanism shown in detail in FIG. 3e.
Figure 3F:
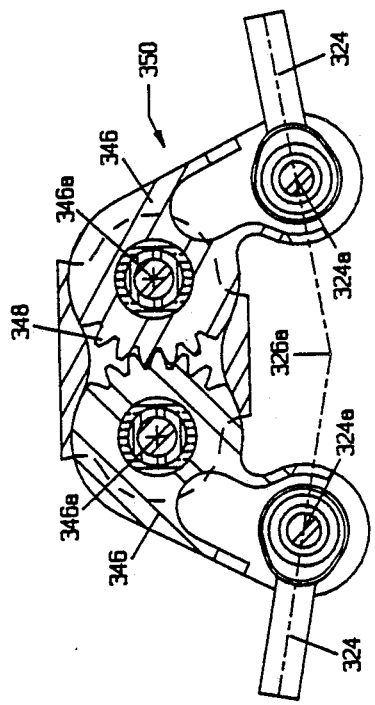
FIG. 3f shows an alternate embodiment of the bell crank mechanism shown in detail in FIG. 3e.

The bell crank mechanism 350 of the alternate embodiment of FIG. 3f is comprised of two cranks 346 which pivot relative to chassis at points 346a and are attached to links 324 at pivot points 324a. The cranks 346 are connected to one another by gear teeth 348.

The bell crank mechanism 360 of the alternate embodiment of FIG. 3g is comprised of two cranks 356 which pivot relative to the chassis at points 356a and are attached to links 324 at pivot points 324a. The cranks 356 are connected to one another by a flexible elastomeric member (such as fabric reinforced rubber) held by slots 356b in cranks 356.

Figure 4B:
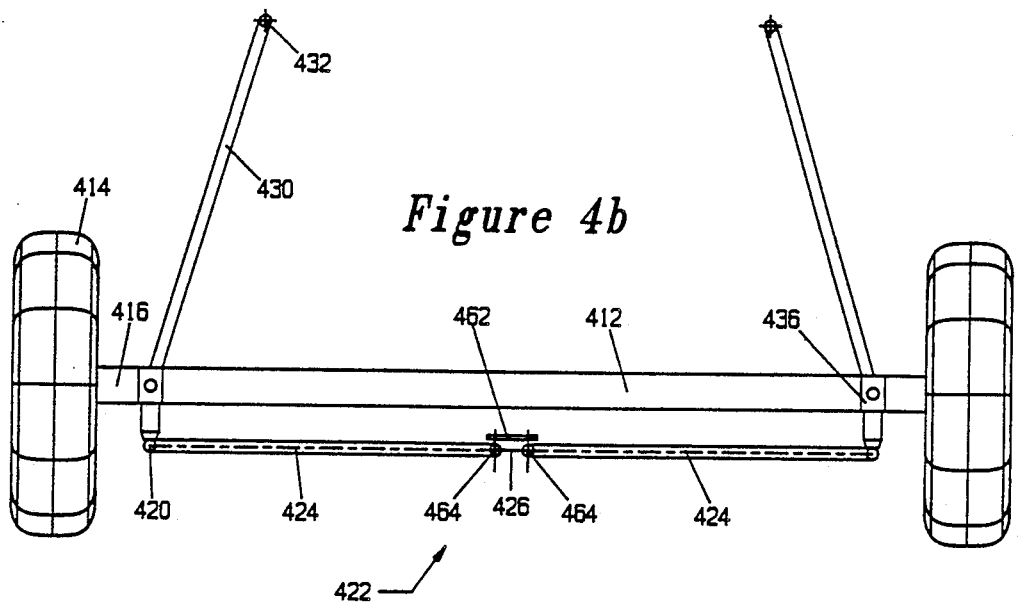
FIG. 4b shows a top plan view of the FIG. 4 embodiment.
Figure 4C:
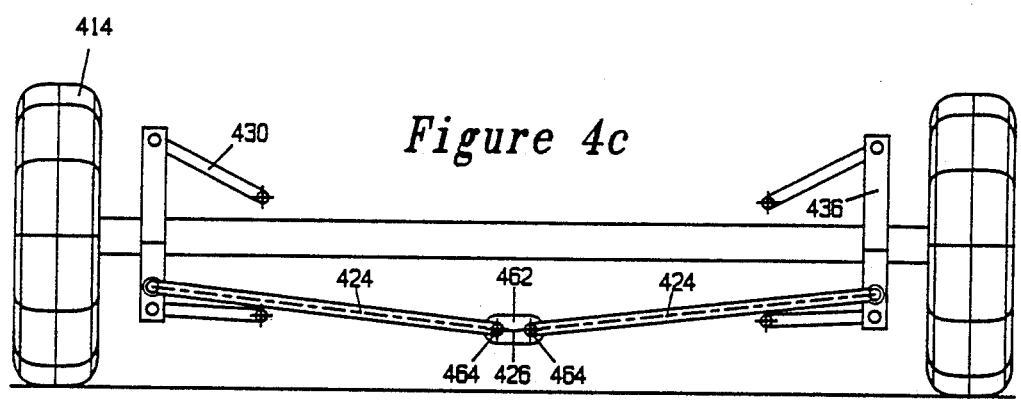
FIG. 4c shows a rear plan view of the FIG. 4 embodiment at normal ride height.
Figure 4D:
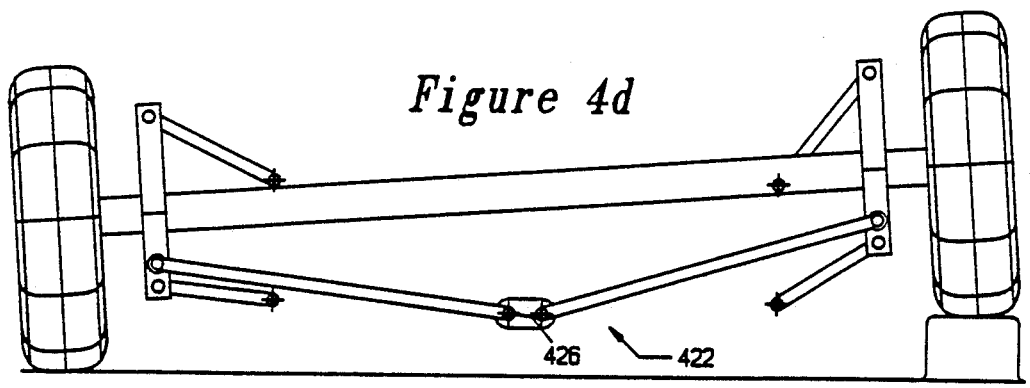
FIG. 4d shows a rear plan view of the FIG. 4 embodiment with one wheel at full bump.

The suspension of the alternate embodiment shown in FIGS. 4–4e, generally designated 410, is designed for use with a vehicle having an axle 412 having wheels 414 located at either end 416. Mounting brackets 418 depend from axle 412 and have mounted to pivot points 420 thereon a roll control mechanism 422 comprising two links 424 which converge to a mounting mechanism 440 and form LLMPA 426.

Mounting mechanism 440 is comprised of a member 462 mounted to the chassis. Links 424 are attached to member 462 at pivot points 464. Pivot points 464 and 420 are designed to be compliant so as to prevent the suspension from binding. Similarly, trailing links 430 (pivotally mounted to chassis at points 432) are attached at their rearward end pivot points 434 to brackets 436 on axle ends 416.

As can be seen in FIG. 4, the instant center 438 of the linkage is drawn by extending on paper the longitudinal axis of the links 430 (as shown by dotted lines in FIGS. 4 and 4a) to the point where they converge at point 438. The roll axis 440 is formed by connecting the instant center 438 and LLMPA 426.

Figure 5:
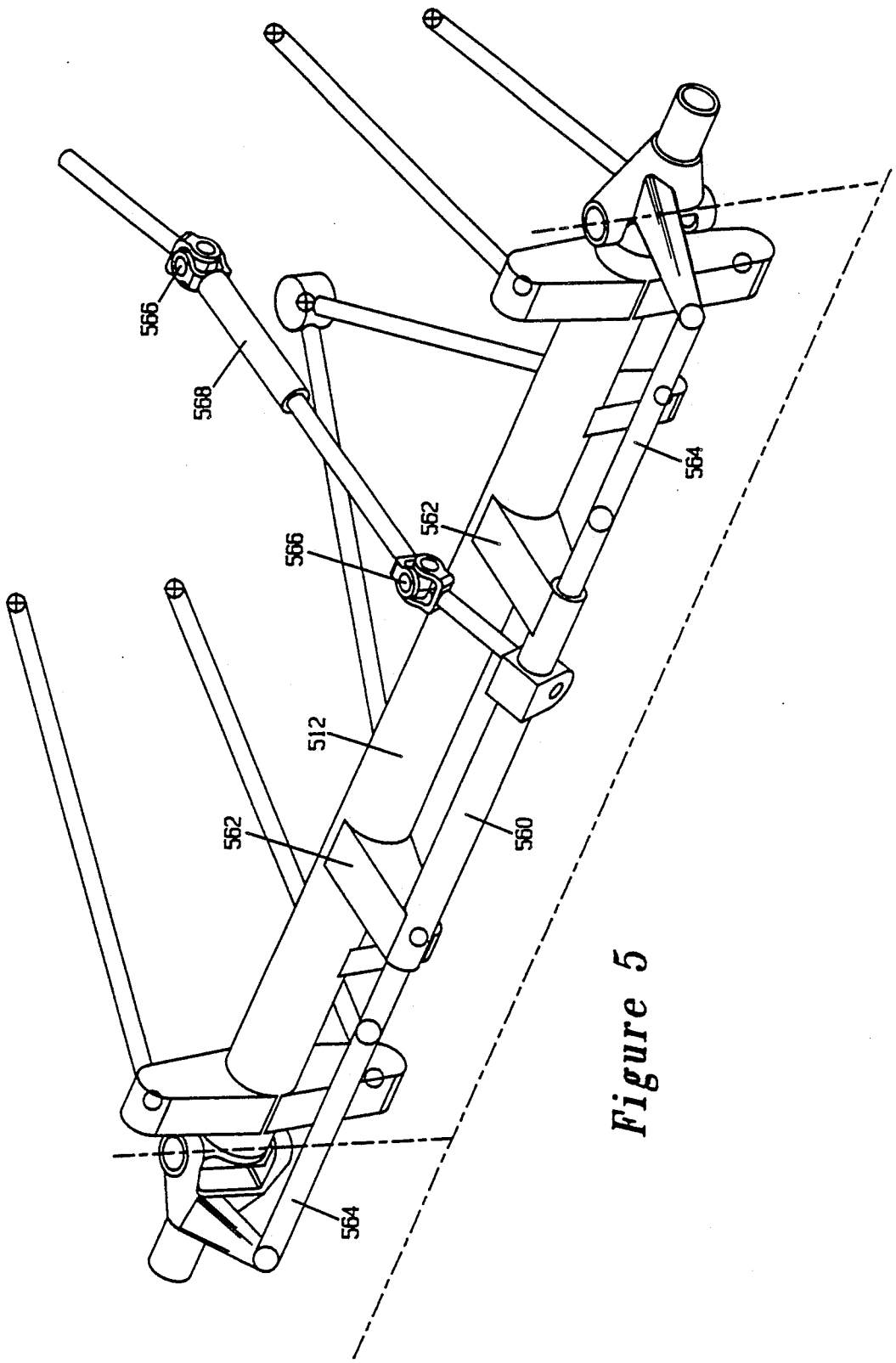
FIG. 5 is a perspective view of the instant invention applied in conjunction with a solid axle and steering rack.

In the FIG. 5 embodiment, the beam axle, generally designated 512 has a steering rack 560 mounted thereon to brackets 562. Because of the location, the rack itself can be extremely small and lightweight as the bending forces being transmitted to the steering rack by the links 564 are relatively light compared to those transmitted to the steering rack in a conventional independent suspension.

Such an arrangement is suited to a wide variety of vehicles everywhere from large tractor trailers having heavy beam axles to light weight racing cars having light tubing axles. To accommodate suspension movement, one need only place the plurality of universal joints 566 in the steering column 568 to accommodate the suspension movement as well as a conventional type sliding spline or equivalent to accomadate changes in length due to suspension travel.

It is contemplated that various changes and modifications may be made to the suspension system without departing from the spirit and scope of the invention as defined by the following claims.

What is claimed is:

1. A vehicle suspension system for suspending a vehicle having a chassis, an axle having wheels at either end thereof, a lateral locating mechanism and a plurality of control links locating said axle to said chassis, wherein the roll axis formed by (1) the instant center of said control links and (2) the LLMPA formed by said lateral locating mechanism is substantially horizontal so as to substantially eliminate bump steer of said axle.

2. The suspension system of claim 1 wherein said lateral locating mechanism comprises a pair of lateral control links attached at first ends to a point along the centerline of said chassis and at second ends to said axle, said lateral control links diverging from said first ends to said second ends.

3. The suspension system of claim 1 further comprising first and second lateral links each having outboard and inboard ends, said outboard ends being attached to said axle adjacent said wheels said inboard ends being attached to said lateral locating mechanism.

4. The suspension system of claim 3 wherein said lateral locating mechanism comprises first and second bell cranks each having a center and first and second ends, said bell cranks being pivotally mounted to said chassis at said centers, said lateral link inboard ends being pivotally mounted to said bell crank first ends, said bell crank second ends being connected by means for causing said bell cranks to rotate in opposite directions to one another.

5. The suspension system of claim 4 where said connecting means comprises meshing gears on said second ends.

6. The suspension system of claim 4 where said connecting means comprises a flexible member mounted between said second ends.

7. The suspension system of claim 4 where said connecting means comprises a connecting link pivotally mounted between said second ends.

8. A vehicle suspension system for suspending a vehicle comprising:
a chassis;
an axle having wheels at either end thereof;
a plurality of trailing links locating said axle to said chassis; and
a lateral locating mechanism comprising a pair of lateral control links attached at first ends to a point along the centerline of said chassis and at second ends to said axle, said lateral control links diverging from said chassis to said axle wherein the roll axis formed by the instant center of said trailing links and the LLMPA formed by said lateral control links is substantially horizontal so as to substantially eliminate bump steer of said axle.

9. The suspension system of claim 8 wherein said lateral control links have compliant mounting means at either end.

10. A vehicle suspension system for suspending a vehicle comprising:
a chassis;
an axle having wheels at either end thereof;
a plurality of control links locating said axle to said chassis; and
first and second lateral links each having outboard and inboard ends, said outboard ends being attached to said axle adjacent said wheels; and
a lateral control mechanism, said inboard ends being attached to said lateral control mechanism, wherein the roll axis formed by the instant center of said control links and the LLMPA formed by said lateral control mechanism is substantially horizontal so as to substantially eliminate bump steer of said axle.

11. The suspension system of claim 10 wherein said lateral control mechanism comprises first and second roll links each having a center and first and second ends, said roll links being pivotally mounted to said chassis at said centers, said lateral link inboard ends being pivotally mounted to said roll link first ends, said roll link second ends being connected by means for causing said bell cranks to rotate in opposite directions to one another.

12. The suspension system of claim 11 where said connecting means comprises meshing gears on said second ends.

13. The suspension system of claim 11 where said connecting means comprises a flexible member mounted between said second ends.

14. The suspension system of claim 11 where said connecting means comprises a connecting link pivotally mounted between said second ends.

15. The suspension system of claim 10 comprising a pair of lateral locating links each having outboard ends and running forwardly to inboard ends mounted to a compliance mechanism.

16. The suspension system of claim 15 wherein said compliance mechanism comprises an elastomeric member mounted to said chassis.

17. The suspension system of claim 15 wherein said compliance mechanism comprises a pair of mounting links pivotally mounted to said chassis at laterally spaced points and to each other and to said inboard ends at a common point.

* * * * *